US009696515B2

(12) United States Patent
Hsu

(10) Patent No.: US 9,696,515 B2
(45) Date of Patent: Jul. 4, 2017

(54) ELECTROMAGNETIC DRIVING MODULE AND LENS DEVICE USING THE SAME

(71) Applicant: TDK TAIWAN CORP., Yangmei Taoyuan (TW)

(72) Inventor: Shang-Yu Hsu, Yangmei Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 44 days.

(21) Appl. No.: 14/527,519

(22) Filed: Oct. 29, 2014

(65) Prior Publication Data

US 2016/0028297 A1 Jan. 28, 2016

(30) Foreign Application Priority Data

Jul. 28, 2014 (TW) .............................. 103125644 A

(51) Int. Cl.

| G02B 7/09 | (2006.01) |
|---|---|
| H02K 33/02 | (2006.01) |
| H05K 7/02 | (2006.01) |
| H02K 41/035 | (2006.01) |
| G02B 7/08 | (2006.01) |
| G02B 7/10 | (2006.01) |
| G03B 3/10 | (2006.01) |
| G03B 5/00 | (2006.01) |

(52) U.S. Cl.
CPC ................ *G02B 7/09* (2013.01); *G02B 7/08* (2013.01); *G02B 7/102* (2013.01); *G03B 3/10* (2013.01); *G03B 5/00* (2013.01); *H02K 41/0356* (2013.01); *G03B 2205/0046* (2013.01); *G03B 2205/0069* (2013.01)

(58) Field of Classification Search
CPC . G02B 7/09; G02B 7/005; G02B 7/04; G02B 7/1827; G02B 7/1828
USPC ........ 359/824, 823, 819, 821, 822, 825, 826
See application file for complete search history.

(56) References Cited

U.S. PATENT DOCUMENTS

| 2009/0128684 A1* | 5/2009 | Apel ................. H01L 27/14618 348/360 |
|---|---|---|
| 2012/0026611 A1* | 2/2012 | Hu ........................... G02B 7/08 359/824 |
| 2014/0072289 A1* | 3/2014 | Lim ....................... G03B 13/36 396/55 |
| 2014/0185991 A1* | 7/2014 | de Jong ................... G02B 6/32 385/79 |
| 2016/0033786 A1* | 2/2016 | Kim ......................... G03B 5/02 359/557 |

FOREIGN PATENT DOCUMENTS

KR 101389375 * 4/2014 .......... G02B 13/001

* cited by examiner

*Primary Examiner* — Zachary Wilkes
*Assistant Examiner* — George G King
(74) *Attorney, Agent, or Firm* — Muncy, Geissler, Olds & Lowe, P.C.

(57) ABSTRACT

An electromagnetic driving module includes an upper housing, a lower housing, a circuit board, a base, a wiring assembly, and a magnetic element. The upper housing is connected to the lower housing. The circuit board is fixed on the upper housing. The base is disposed in a space defined by the upper housing and the lower housing. The wiring assembly is disposed on the base. The magnetic element corresponds to the wiring assembly and is disposed on the upper housing.

18 Claims, 3 Drawing Sheets

ELECTROMAGNETIC DRIVING MODULE AND LENS DEVICE USING THE SAME

CROSS REFERENCE TO RELATED APPLICATIONS

This Application claims priority of Taiwan Patent Application No. 103125644, filed on Jul. 28, 2014, the entirety of which is incorporated by reference herein.

BACKGROUND OF THE DISCLOSURE

Field of the Invention

The present invention relates to a driving module and a lens device using the same, and more particularly to an electromagnetic driving module which converts electrical energy into mechanical energy and a lens device using the same.

Description of the Related Art

Generally, an electronic device includes a driving module to drive an element to move a predetermined distance. For example, an electronic device having an image-capturing function usually includes a driving module to generate driving power. One or more optical lens units of the electronic device are driven by the driving power to move along an optical axis, so as to facilitate auto-focus and auto-zoom controls.

However, since the driving module includes a complex driving member, such as stepper motor, ultrasonic motor, piezoelectric actuators, etc. to generate the driving power and the driving power has to be transmitted by a number of transmission elements, it is not easy to assemble and the manufacturing cost is high. In addition, a conventional driving module is also large in size and has a high power consumption due to its complex construction.

Therefore, a driving module that has the advantages of small size and simple construction is desired by the manufacturers.

BRIEF SUMMARY OF THE DISCLOSURE

Accordingly, one objective of the present invention is to provide an electromagnetic driving module, which is configured to provide a driving force to drive an element such as a lens module positioned in the electromagnetic driving module to move.

According to some embodiments of the disclosure, the electromagnetic driving module includes an upper housing, a lower housing, a circuit board, a base, a wiring assembly, and a magnetic element. The lower housing is connected to the upper housing. The circuit board is fixed on the upper housing. The base is disposed in a space defined by the upper and the lower housings. The wiring assembly is disposed on the base. The magnetic element corresponds to the wiring assembly and is disposed on the upper housing.

In some embodiments, the lower housing includes a seat and a positioning structure that is adjacent to the wiring assembly and extends from the seat toward the upper housing. The positioning structure comprises a first side wall and a second side wall, and the first side wall is closer to the wiring assembly than the second side wall. A gap is formed between the first side wall and the wiring assembly, wherein the wiring assembly comprises a planar surface, and the gap is formed between the planar surface and the first side wall.

In some embodiments, the upper housing includes an upper sub-member and a lateral sub-member extending from an edge of the upper sub-member toward the lower housing, and the circuit board is fixed on the lateral sub-member. In some embodiments, the circuit board is fixed on the upper housing via a fixing material comprising a soldering material. The fixing material includes soldering material, the circuit board is fixed on the upper housing by soldering. Alternatively, the fixing material includes glue, the circuit board is fixed on the upper housing by gluing.

In some embodiments, the electromagnetic driving module includes two magnetic elements disposed on the upper housing and symmetrical to an axis of the base.

In some embodiments, the electromagnetic driving module further includes a reference element and a sensor element. The reference element is disposed on the base, and the sensor element corresponds to the reference element and is disposed on the circuit board.

Another objective of the present invention is to provide a lens device. The lens device includes any electromagnetic driving module in any of the embodiments mentioned above and a lens module disposed in the electromagnetic driving module. The electromagnetic driving module adjusts the position of the lens module to facilitate auto-focus and auto-zoom controls.

The electromagnetic driving module of the present disclosure includes a circuit board for positioning a sensor, and the circuit board is directly fixed on the inner surface of the upper housing. Therefore, compared with a conventional driving module, the electromagnetic driving module of the present disclosure has the advantages of efficient space utilization, being easy to assembly, and low manufacturing cost.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

The making and using of the embodiments of the disclosure are discussed in detail below. It should be appreciated, however, that the embodiments can be embodied in a wide variety of specific contexts. The specific embodiments discussed are merely illustrative, and do not limit the scope of the disclosure.

Figure 1:
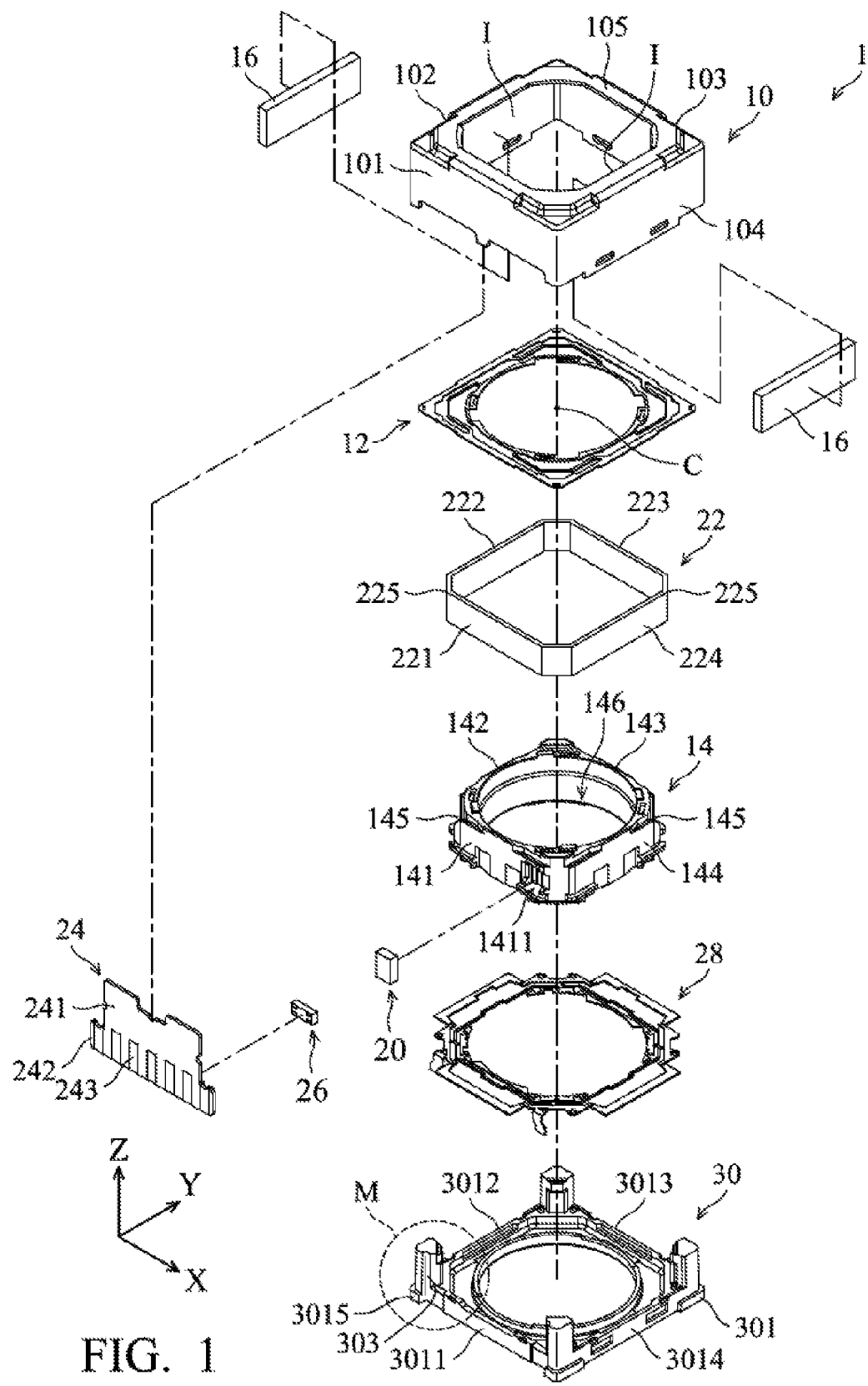
FIG. 1 shows an exploded view of an electromagnetic driving module, in accordance with some embodiments.

FIG. 1 shows an exploded view of an electromagnetic driving module 1. In some embodiments, the electromagnetic driving module 1 is a voice coil motor (VCM) which includes an upper housing 10, an upper spring sheet 12, a base 14, two magnetic elements 16, a reference element 20, a wiring assembly 22, a circuit board 24, a sensor element 26, a lower spring sheet 28, and a lower housing 30. The elements of the electromagnetic driving module 1 can be added to or omitted, and the invention should not be limited by the embodiment.

The upper housing 10 is connected to the lower housing 30. The upper spring sheet 12, the base 14, the two magnetic elements 16, the reference element 20, the wiring assembly 22, the circuit board 24, the sensor element 26, and the lower spring sheet 28 are positioned in a place defined by the upper housing 10 and the lower housing 30.

In some embodiments, the upper housing 10 includes an upper sub-member 105 and one or more lateral sub-members extending from edges of the upper sub-member 105 toward the lower housing 30. For example, as shown in FIG. 1, the upper housing 10 includes a number of lateral sub-members 101, 102, 103, and 104. The lateral sub-members 101, 102, 103, and 104 connecting each other consecutively, wherein the lateral sub-members 101 and 103 face each other, and the lateral sub-members 102 and 104 face each other. The lateral sub-members 101, 102, 103, and 104 may be made individually and are assembled by suitable means. Alternatively, the lateral sub-members 101, 102, 103, and 104 may be formed integrally. In some non-illustrated embodiments, the upper housing 10 includes a lateral sub-member which has a cylindrical configuration.

The upper spring sheet 12 and lower spring sheet 28 are configured for supporting the base 14 and enabling the base 14 to move in a vertical direction (Z-axis) in the upper and lower housings 10 and 30. In some embodiments, the upper spring sheet 12 is fixed at the upper housing 10, and the lower spring sheet 28 is fixed at the lower housing 30. In some embodiments, the lower spring sheet 28 is electrically connected to the circuit board 24.

In some embodiments, the base 14 is penetrated by a passage 146 and is configured to support an element, such as a lens module (not shown in FIG. 1). In addition, the base 14 includes one or more side surfaces surrounding the passage 146. For example, the base 14 includes a number of side surfaces, such as a first side surface 141, a second side surface 142, a third side surface 143, and a fourth side surface 144. The first side surface 141 is opposite to the third side surface 143, and the second side surface 142 is opposite to the fourth side surface 144.

In some embodiments, the base 14 further includes a number of connecting surfaces 145. Each connecting surface 145 connects one side surface to another neighboring side surface, and an angle is formed between each connecting surface and the adjacent side surface. For example, the connecting surface 145 connects the first side surface 141 to the second side surface 142, and an angle is formed between the connecting surface 145 and the first side surface 141 or the second side surface 142. It is appreciated that the configuration of the base 14 should not be limited to the above-mentioned embodiments, in some non-illustrated embodiments, the base 14 includes a side surface, which has a cylindrical configuration.

The wiring assembly 22 has a circular structure that surrounds the side surface of the base 14. The wiring assembly 22 allows an electric current to pass therethrough so as to generate a magnetic field to drive the base 14 to move relative to the upper and the lower housings 10 and 30. In some embodiments, the wiring assembly 22 includes a first section 221, a second section 222, a third section 223, a fourth section 224, and a number of connecting sections 225. The first section 221, the second section 222, the third section 223, and the fourth section 224 are respectively positioned on the first side surface 141, the second side surface 222, the third side surface 143, and the fourth side surface 144. The connecting sections 225 are positioned on the connecting surface 145. The first section 221, the second section 222, the third section 223, and the fourth section 224 are connected to one the other via one of the connecting sections 225. In some embodiments, a surface of the connecting section 225 away from the connecting surface 145 is a planar surface. The advantage of this feature will be described more detail in the description referring to FIG. 3. In some embodiments, the wiring assembly 22 is electrically connected to the lower spring sheet 28. The electrical current from the outside power source is transmitted to the wiring assembly 22 via the circuit board 24 and the lower spring sheet 28.

The two magnetic elements 16 are symmetrical to an axis C penetrating the passage 146 of the base 14 and positioned on the lateral sub-members 102 and 104 of the upper housing 10. In some embodiments, the upper housing 10 is made of magnetic material, and the two magnetic elements 16 are directly attached on the inner surfaces of the lateral sub-members 102 and 104 of the upper housing 10 that face the base 14. In this embodiment, as shown in FIG. 1, the lateral sub-members 102 and 104 do not have a through hole for receiving the magnetic elements 16, and the inner surfaces I are substantially parallel to the axis C. As a result, the assembly process for the two magnetic elements 16 is simplified.

Through the above-mentioned arrangements, in the operation of the electromagnetic driving module 1, the base 14 is stably driven to move along a vertical direction (Z-axis) by the magnetic field generated by the two magnetic elements 16 the wiring assembly 2. Therefore, the control accuracy of the base 14 is improved. However, it is appreciated that the positions of the two magnetic elements 16 should not be limited to the embodiment. The position of the two magnetic elements 16 can be modified, as along as the base 14 can be stably driven by the magnetic force.

The circuit board 24 is directly fixed on the lateral sub-member of the upper housing 10 via suitable means. Power or electrical signals from the outside are transmitted to the elements in the electromagnetic driving module 1 via the circuit board 24. In some embodiments, the circuit board 24 includes a first portion 241, a second portion 242, and a number of conductive contacts 243. The first portion 241 is connected to the second portion 242. The conductive contacts 243 are positioned at the second portion 242 for providing electrical connection to outside circuit. The circuit board 24 may be a flexible circuit board (FPC), the second portion 242 of the circuit board 24 may be exposed to the outside of the electromagnetic driving module 1 via an opening (not indicated in FIG. 1) formed between the upper housing 10 and the lower housing 30, but the disclosure should not be limited thereto.

The reference element 20 is positioned in a groove 1411 formed on the first lateral side surface 141 of the base 14. The sensor element 26 corresponds to the reference element 20 and is positioned on the circuit board 24. In some embodiments, the reference element 20 is a permanent magnet, and the sensor element 26 is a Hall Effect sensor. By detecting the permanent magnet of the reference element 20, the sensor element 26 produces an electrical signal based on the position of the reference element 20, so that the position of the base 14 is measured. In some embodiments, the reference element 20 includes an optical transmitter, and the sensor element 26 includes a position signal receiver. By receiving the signal from the reference element 20, the sensor element 26 produces an electrical signal based on the position of the reference element 20, so that the position of the base 14 is measured. In some embodiments, the electrical signal produced by the sensor element 26 is transmitted to a control system (not shown in the figure) via the circuit board 24. The control system adjusts the electrical current applied to the wiring assembly 24 according to the electrical signal from the sensor element 26.

In some embodiments, the lower housing 30 includes a seat 301 and a number of positioning structures 303. The seat 301 includes a number of connecting portions to connect the lateral sub-members of the upper housing 10. For example, the seat 301 includes a first connecting portion 3011, a second connecting portion 3012, a third connecting portion 3013, and a fourth connecting portion 3014. The lateral sub-members 101, 102, 103, and 104 of the upper housing 10 respectively connect to one of the first connecting portion 3011, the second connecting portion 3012, the third connecting portion 3013, and the fourth connecting portion 3014 of the lower housing 30 by suitable means (such as clamping). The positioning structures 303 are respectively positioned at corners of each two neighboring connecting portions. For example, the lower housing 30 includes four positioning structures 303. One of the four positioning structures 303 is positioned at the corner 3015 of the first connecting portion 3011 and the second connecting portion 3012 and extends toward the upper housing 10. The structural feature of the positioning structure 303 is described in more detail in the descriptions of FIG. 3.

Figure 2:
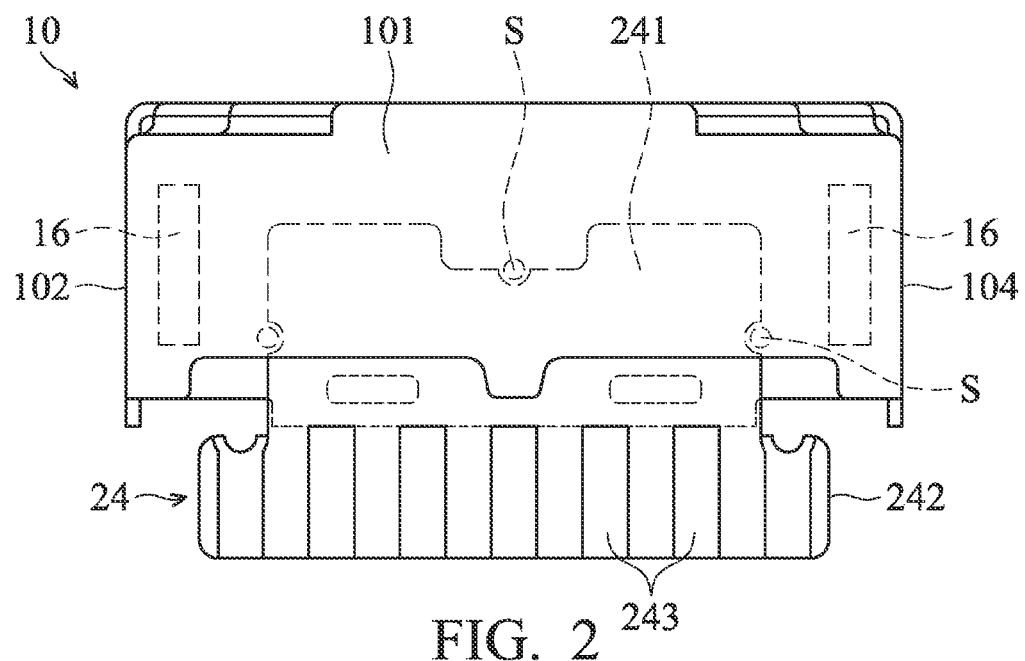
FIG. 2 shows a side view of a portion of the electromagnetic driving module, in accordance with some embodiments.

Referring to FIG. 2, method for fixing the circuit board 24 on the upper housing 10 is described below. In some embodiments, the fixing material S is positioned on the edge of the first portion 241 of the circuit board 24, and the circuit board 24 is fixed on the inner surface of the upper housing 10 via the fixing material S. In some non-illustrated embodiments, the fixing material S is positioned on the surface of the circuit board that faces the upper housing 10, and the circuit board 24 is fixed on the inner surface of the upper housing 10 via the fixing material S. The fixing material S may be a soldering material (such as tin solder), and the circuit board 24 is fixed on the upper housing 10 by a soldering process. Alternatively, the fixing material S may be glue, and the circuit board 24 is fixed on the upper housing 10 by gluing. In some other embodiments, the fixing material S is omitted, the circuit board 24 is fixed on the upper housing 10 by a thermal welding process.

It should be noted that, while the circuit board 24 shown in FIG. 2 is fixed on the lateral sub-frame 101 of the upper housing 10 where the magnetic elements 16 are not positioned, the disclosure should not be limited thereto. In some non-illustrated embodiments, the circuit board 24 and the magnetic elements 16 are positioned on one single lateral sub-frame of the upper housing 10, wherein the magnetic elements 16 and the circuit board 24 do not overlap each other so as to decrease the size.

Figure 3:
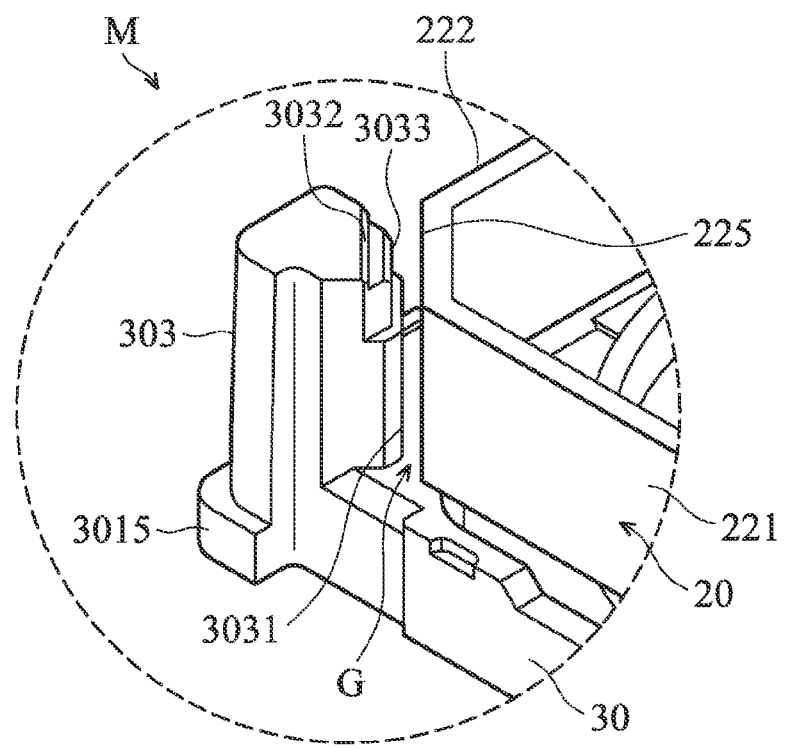
FIG. 3 shows an enlarged view of a portion of the electromagnetic driving module shown in FIG. 1.

FIG. 3 shows an enlarged view of the lower housing 30 and the wiring assembly 22 in the M region of FIG. 1. In some embodiments, after assembling the electromagnetic driving module 1, the positioning structures 303 of the lower housing 30 are adjacent to the wiring assembly 22. Specifically, each positioning structure 303 is adjacent to one of the connecting sections 225 of the wiring assembly 22. At a side of each positioning structure 303 that is adjacent to the corresponding connecting section 225, each positioning structure 303 includes a first side wall 3031, a second side wall 3032, and a third side wall 3033. The first side wall 3031 is closer to the corresponding connecting section 225 of the wiring assembly 22 than the second side wall 3032 or the third side wall 3033. The third side wall 3033 is closer to the corresponding connecting section 225 of the wiring assembly 22 than the second side wall 3032. In some embodiments, a gap G is formed between each first side wall 3031 and the corresponding connecting section 225 of the wiring assembly 22. Namely, the first side walls 3031 are not connected to the connecting sections 225.

Figure 4:
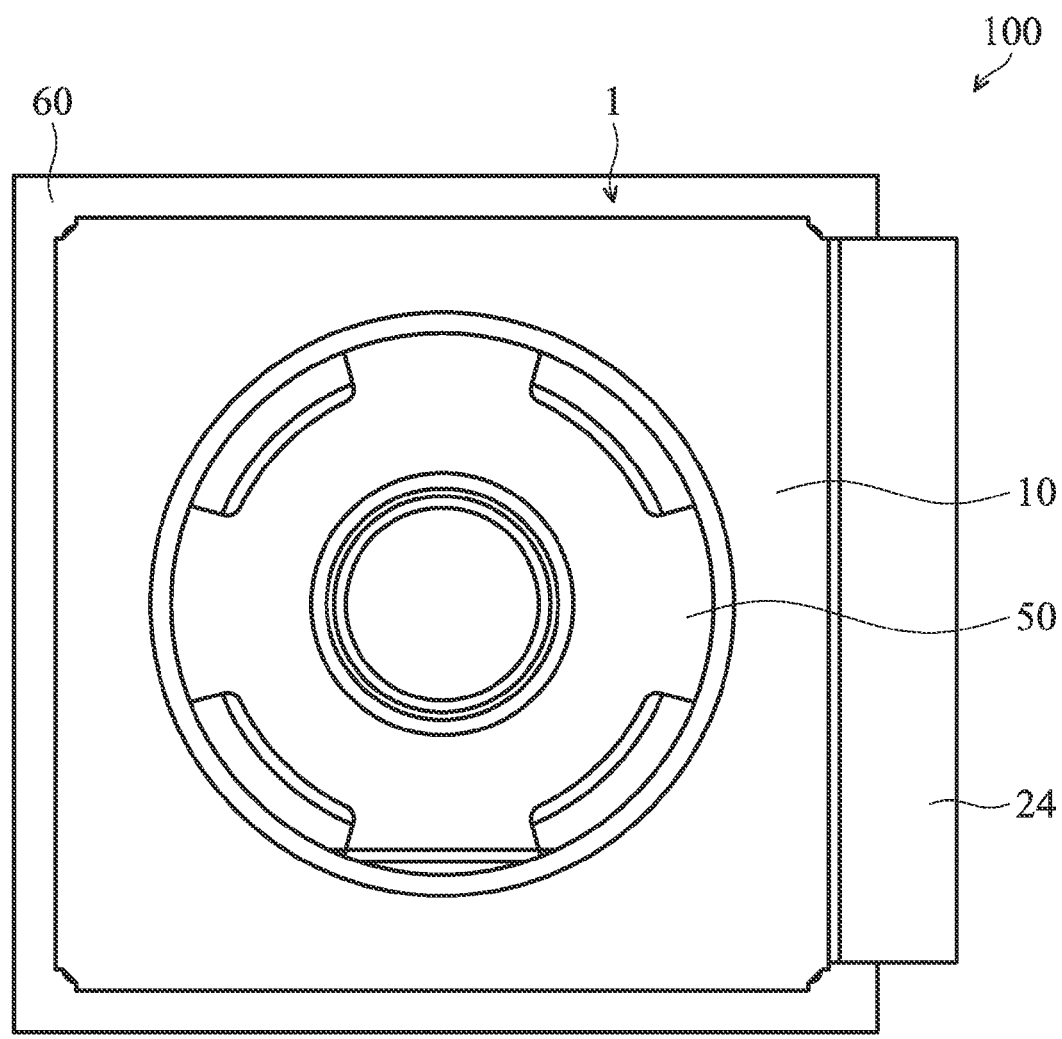
FIG. 4 shows a top view of a lens device including an electromagnetic driving module, in accordance with some embodiments.

FIG. 4 shows a top view of the electromagnetic driving module 1 applied to a lens device 100. In some embodiments, the lens device 100 includes the electromagnetic driving module 1, a lens module 50 and an optical sensor 60. The lens module 50 is positioned in the base 14 (FIG. 1), and the light receiving surface of the lens module 50 is adjacent to the upper housing 10, and the light emitting surface of the lens module 50 is adjacent to the optical sensor 60. The optical sensor 60 is a CMOS sensor, for example. The optical sensor 60 receives light passing through the lens module 50 and produces an image signal. The electromagnetic driving module 1 controls the focal length between the lens module 50 and the optical sensor 60, so as to facilitate an auto-focus and an auto-zoom control.

Compared with the conventional electromagnetic driving module, the electromagnetic driving module of the disclosure omits a frame positioned between the coil assembly and the upper housing. As a result, the size of the module is reduced and the manufacturing cost is decreased. In addition, since the circuit board 24 is directly fixed on the upper housing 10, the production efficiency is improved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electromagnetic driving module, comprising:
    a lower housing;
    an upper housing, comprising an upper sub-member and a lateral sub-member extending from an edge of the upper sub-member toward the lower housing;
    a circuit board mounted on a first inner surface of the lateral sub-member of the upper housing, and the circuit board is substantially parallel to the first inner surface;
    a base disposed in a space defined by the upper and the lower housings;
    a wiring assembly disposed on the base; and at least one magnetic element, wherein a first magnetic element corresponding to the wiring assembly and disposed on a second inner surface of the lateral sub-member, wherein the circuit board is situated on a different side of the lateral sub-member than any of the magnetic elements situated on the sides of the lateral sub-member, and the lateral sub-member has no through hole for receiving the magnetic elements.

2. The electromagnetic driving module as claimed in claim 1, wherein the circuit board is fixed on the upper housing via a fixing material comprising a soldering material.

3. The electromagnetic driving module as claimed in claim 1, wherein the circuit board is fixed on the upper housing via a fixing material comprising glue.

4. The electromagnetic driving module as claimed in claim 1, further comprising a second magnetic element, wherein the first and second magnetic elements are disposed on the upper housing and symmetrical to an axis of the base.

5. The electromagnetic driving module as claimed in claim 1, further comprising a reference element and a sensor element, wherein the reference element is disposed on the base, and the sensor element corresponds to the reference element and is disposed on the circuit board.

6. The electromagnetic driving module as claimed in claim 1, wherein the lower housing comprises a seat and a positioning structure that is adjacent to the wiring assembly and extends from the seat toward the upper housing, wherein the positioning structure comprises a first side wall and a second side wall, and the first side wall is closer to the wiring assembly than the second side wall.

7. The electromagnetic driving module as claimed in claim 6, wherein a gap is formed between the first side wall and the wiring assembly.

8. The electromagnetic driving module as claimed in claim 7, wherein the wiring assembly comprises a planar surface, and the gap is formed between the planar surface and the first side wall.

9. A lens device, comprising an electromagnetic driving module as claimed in claim 1, and a lens module disposed in the electromagnetic driving module.

10. An electromagnetic driving module, comprising:
   a lower housing;
   an upper housing, comprising an upper sub-member and a lateral sub-member extending from an edge of the upper sub-member toward the lower housing;
   a circuit board mounted on a first inner surface of the lateral sub-member of the upper housing, and the circuit board is substantially parallel to the first inner surface;
   a base disposed in a space defined by the upper and the lower housings;
   a wiring assembly disposed on the base; and at least one magnetic element, wherein a first magnetic element corresponding to the wiring assembly and disposed on a second inner surface of the lateral sub-member, wherein the circuit board is situated on a different side of the lateral sub-member than any of the magnetic elements situated on the sides of the lateral sub-member, and the second inner surface of the lateral sub-member is substantially parallel to an axis of the base.

11. The electromagnetic driving module as claimed in claim 10, wherein the circuit board is fixed on the upper housing via a fixing material comprising a soldering material.

12. The electromagnetic driving module as claimed in claim 10, wherein the circuit board is fixed on the upper housing via a fixing material comprising glue.

13. The electromagnetic driving module as claimed in claim 10, further comprising a second magnetic element, wherein the first and second magnetic elements are disposed on the upper housing and symmetrical to the axis of the base.

14. The electromagnetic driving module as claimed in claim 10, further comprising a reference element and a sensor element, wherein the reference element is disposed on the base, and the sensor element corresponds to the reference element and is disposed on the circuit board.

15. The electromagnetic driving module as claimed in claim 10, wherein the lower housing comprises a seat and a positioning structure that is adjacent to the wiring assembly and extends from the seat toward the upper housing, wherein the positioning structure comprises a first side wall and a second side wall, and the first side wall is closer to the wiring assembly than the second side wall.

16. The electromagnetic driving module as claimed in claim 15, wherein a gap is formed between the first side wall and the wiring assembly.

17. The electromagnetic driving module as claimed in claim 16, wherein the wiring assembly comprises a planar surface, and the gap is formed between the planar surface and the first side wall.

18. A lens device, comprising an electromagnetic driving module as claimed in claim 10, and a lens module disposed in the electromagnetic driving module.

* * * * *